United States Patent
Lee et al.

(10) Patent No.: US 9,805,716 B2
(45) Date of Patent: Oct. 31, 2017

(54) APPARATUS AND METHOD FOR LARGE VOCABULARY CONTINUOUS SPEECH RECOGNITION

(71) Applicant: Electronics and Telecommunications Research Institute, Daejeon (KR)

(72) Inventors: Sung Joo Lee, Daejeon (KR); Byung Ok Kang, Daejeon (KR); Jeon Gue Park, Daejeon (KR); Yun Keun Lee, Daejeon (KR); Hoon Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/042,309

(22) Filed: Feb. 12, 2016

(65) Prior Publication Data
US 2016/0240190 A1    Aug. 18, 2016

(30) Foreign Application Priority Data
Feb. 12, 2015    (KR) .................. 10-2015-0021339

(51) Int. Cl.
*G10L 15/14* (2006.01)
*G10L 15/16* (2006.01)
*G10L 15/06* (2013.01)
*G10L 21/02* (2013.01)

(52) U.S. Cl.
CPC ............ *G10L 15/142* (2013.01); *G10L 15/16* (2013.01); *G10L 15/063* (2013.01); *G10L 21/02* (2013.01)

(58) Field of Classification Search
CPC ........................ G10L 21/0208; G10L 15/20
See application file for complete search history.

(56) References Cited

U.S. PATENT DOCUMENTS

| | | | |
|---|---|---|---|
| 6,876,966 B1 * | 4/2005 | Deng | ................... G06K 9/6256 704/233 |
| 8,666,739 B2 | 3/2014 | Jeon et al. | |
| 8,798,290 B1 * | 8/2014 | Choi | ................... G10L 21/0316 379/406.01 |
| 8,930,196 B2 | 1/2015 | Jung et al. | |

(Continued)

OTHER PUBLICATIONS

Blum, Avrim, and Tom Mitchell. "Combining labeled and unlabeled data with co-training." Proceedings of the eleventh annual conference on Computational learning theory. ACM, 1998.*

(Continued)

*Primary Examiner* — Matthew Baker
(74) *Attorney, Agent, or Firm* — Nelson Mullins Riley & Scarborough LLP; Anthony A. Laurentano (57) ABSTRACT

Provided is an apparatus for large vocabulary continuous speech recognition (LVCSR) based on a context-dependent deep neural network hidden Markov model (CD-DNN-HMM) algorithm. The apparatus may include an extractor configured to extract acoustic model-state level information corresponding to an input speech signal from a training data model set using at least one of a first feature vector based on a gammatone filterbank signal analysis algorithm and a second feature vector based on a bottleneck algorithm, and a speech recognizer configured to provide a result of recognizing the input speech signal based on the extracted acoustic model-state level information.

15 Claims, 9 Drawing Sheets

(56) References Cited

U.S. PATENT DOCUMENTS

| | | | |
|---|---|---|---|
| 2003/0236661 A1* | 12/2003 | Burges | G06K 9/4647 704/205 |
| 2008/0082320 A1* | 4/2008 | Popa | G10L 13/033 704/201 |
| 2013/0191128 A1 | 7/2013 | Yoo et al. | |
| 2015/0006175 A1 | 1/2015 | Park et al. | |
| 2017/0061978 A1* | 3/2017 | Wang | G10L 21/0232 |

OTHER PUBLICATIONS

Deng, Li, et al. "High-performance robust speech recognition using stereo training data." Acoustics, Speech, and Signal Processing, 2001. Proceedings.(ICASSP'01). 2001 IEEE International Conference on. vol. 1. IEEE, 2001.*

Koizumi, Yuma, and Katunobu Itou. "Intra-note segmentation via sticky HMM with DP emission." 2014 IEEE International Conference on Acoustics, Speech and Signal Processing (ICASSP). IEEE, 2014.*

Hinton, G. et al., "Deep Neural Networks for Acoustic Modeling in Speech Recognition," IEEE Signal Processing Magazine, pp. 82-97 (2012).

* cited by examiner

APPARATUS AND METHOD FOR LARGE VOCABULARY CONTINUOUS SPEECH RECOGNITION

CROSS-REFERENCE TO RELATED APPLICATION(S)

This application claims the priority benefit of Korean Patent Application No. 10-2015-0021339 filed on Feb. 12, 2015, in the Korean Intellectual Property Office, the disclosure of which is incorporated herein by reference.

BACKGROUND

1. Technical Field

Embodiments relate to large vocabulary continuous speech recognition (LVCSR) technology, and more particularly, to an apparatus and method to improve performance of LVCSR technology based on a context-dependent deep neural network hidden Markov model (CD-DNN-HMM) algorithm.

2. Description of the Related Art

To implement a large vocabulary continuous speech recognition (LVCSR) system based on a context-dependent deep neural network hidden Markov model (CD-DNN-HMM) algorithm, hidden Markov model (HMM)-state level information may be necessary. In general, to obtain the HMM-state level information, a speech recognition system based on a Gaussian mixture model HMM (GMM-HMM) algorithm may be used. Thus, performance of the CD-DNN-HMM algorithm based LVCSR may be greatly affected by performance of the GMM-HMM algorithm based speech recognition.

However, in a case of general GMM-HMM algorithm based speech recognition technology, an accuracy in obtaining the HMM-state level information associated with an input speech signal may not be guaranteed, which may restrict the performance of the CD-DNN-HMM algorithm based LVCSR.

Thus, to provide a more stable and accurate result of the CD-DNN-HMM algorithm based LVCSR, there is a desire for a method of increasing an accuracy in obtaining the HMM-state level information using the GMM-HMM algorithm based speech recognition technology.

SUMMARY

According to an aspect, there is provided a speech recognition apparatus including an extractor configured to extract acoustic model-state level information corresponding to an input speech signal from a training data model set using at least one of a first feature vector based on a gammatone filterbank signal analysis algorithm and a second feature vector based on a bottleneck algorithm, and a speech recognizer configured to provide a result of recognizing the input speech signal based on the extracted acoustic model-state level information.

The extractor may obtain the acoustic model-state level information by applying at least one of the first feature vector and the second feature vector to a Gaussian mixture model-hidden Markov model (GMM-HMM) technology based training data model set.

The first feature vector may be determined based on at least one of an intra-frame feature value associated with a feature of a rapid change in a spectrum of the input speech signal, a static feature value associated with a static feature of the input speech signal, and an inter-frame feature value associated with a dynamic feature of the input speech signal based on a lapse of a period of time.

The second feature vector may be obtained by directly learning an equation needed for extracting a feature from the training data model set based on a deep neural network (DNN) algorithm.

The speech recognition apparatus may further include a preprocessor configured to eliminate background noise from at least one set of training data included in the training data model set.

The preprocessor may include a measurer configured to divide the training data into preset frame units and measure an energy value for each of the frame units, and a determiner configured to determine the training data to be clean data in response to a mean of measured energy values being less than a first threshold value, and determine the training data to be noisy data in response to the mean of the measured energy values being greater than or equal to the first threshold value.

The determiner may calculate a deviation between energy values of the training data determined to be the noisy data, determine the training data to be stationary noisy data in response to the calculated deviation being less than a second threshold value, and determine the training data to be non-stationary noisy data in response to the calculated deviation being greater than or equal to the second threshold value.

The preprocessor may eliminate the stationary noisy data using single channel speech enhancement technology in response to the training data determined to be the stationary noisy data, and eliminate the non-stationary noisy data using signal channel speech separation technology in response to the training data determined to be the non-stationary noisy data.

The extractor may extract the acoustic model-state level information additionally using a third feature vector including at least one of a spectral entropy based additional feature, a harmonic component ratio based additional feature, and a pitch information based additional feature.

According to another aspect, there is provided a speech recognition apparatus including a preprocessor configured to eliminate background noise from at least one set of training data included in a training data model set, an extractor configured to extract acoustic model-state level information corresponding to an input speech signal from the training data model set using at least one of a first feature vector based on a gammatone filterbank signal analysis algorithm and a second feature vector based on a bottleneck algorithm, and a speech recognizer configured to provide a result of recognizing the input speech signal based on the extracted acoustic model-state level information.

The preprocessor may determine the training data to be one of clean data, stationary noisy data, and non-stationary noisy data using an energy value measured for each of preset frame units of the training data.

The preprocessor may eliminate the stationary noisy data using single channel speech enhancement technology in response to the training data determined to be the stationary noisy data, and eliminate the non-stationary noisy data using single channel speech separation technology in response to the training data determined to be the non-stationary noisy data.

The extractor may extract the acoustic model-state level information additionally using a third feature vector including at least one of a spectral entropy based additional feature, a harmonic component ratio based additional feature, and a pitch information based additional feature.

The extractor may obtain the acoustic model-state level information by applying at least one of the first feature vector and the second feature vector to a GMM-HMM technology based training data model set.

According to still another aspect, there is provided a speech recognition method including extracting acoustic model-state level information corresponding to an input speech signal from a training data model set using at least one of a first feature vector based on a gammatone filterbank signal analysis algorithm and a second feature vector based on a bottleneck algorithm, and providing a result of recognizing the input speech signal based on the extracted acoustic model-state level information.

The speech recognition method may further include eliminating background noise from at least one set of training data included in the training data model set.

The eliminating of the background noise may include determining the training data to be one of clean data, stationary noisy data, and non-stationary noisy data using an energy value measured for each of preset frame units of the training data, and eliminating the stationary noisy data using single channel speech enhancement technology in response to the training data determined to be the stationary noisy data, and eliminating the non-stationary noisy data using single change speech separation technology in response to the training data determined to be the non-stationary noisy data.

The extracting of the acoustic model-state level information may include obtaining the acoustic model-state level information by applying at least one of the first feature vector and the second feature vector to a GMM-HMM technology based training data model set.

The first feature vector may be determined based on at least one of an intra-frame feature value associated with a feature of a rapid change in a spectrum of the input speech signal, a static feature value associated with a static feature of the input speech signal, and an inter-frame feature value associated with a dynamic feature of the input speech signal based on a lapse of a period of time. The second feature vector may be obtained by directly training an equation needed for extracting a feature from the training data model set based on a DNN algorithm.

The extracting of the acoustic model-state level information may include extracting the acoustic model-state level information additionally using a third feature vector including at least one of a spectral entropy based additional feature, a harmonic component ratio based additional feature, and a pitch information based additional feature.

BRIEF DESCRIPTION OF THE DRAWINGS

These and/or other aspects, features, and advantages of the present disclosure will become apparent and more readily appreciated from the following description of embodiments, taken in conjunction with the accompanying drawings of which.

DETAILED DESCRIPTION

Reference will now be made in detail to embodiments of the present disclosure, examples of which are illustrated in the accompanying drawings, wherein like reference numerals refer to the like elements throughout. Here, the examples are not construed as being intended to limit the present disclosure and should be understood to include all changes, equivalents, and replacements within the idea and the technical scope of the present disclosure.

Unless otherwise defined, all terms including technical and scientific terms used herein have the same meaning as currently and widely used and also commonly understood by one of ordinary skill in the art to which these embodiments belong. It will be further understood that the terms used herein may vary depending on an intention of one of ordinary skill in the art, a convention, or the advent of new technology.

In addition, some terms used herein are selected by an applicant(s) to assist the reader in gaining an understanding about the embodiments and/or provide convenience for description. In such a case, detailed meanings of the terms will be described in Detailed Description. Thus, the terms used herein should be interpreted as having a meaning that is consistent with their meaning in the context of the present disclosure and will not be interpreted as having a meaning simply indicated by the terms per se.

Figure 1:
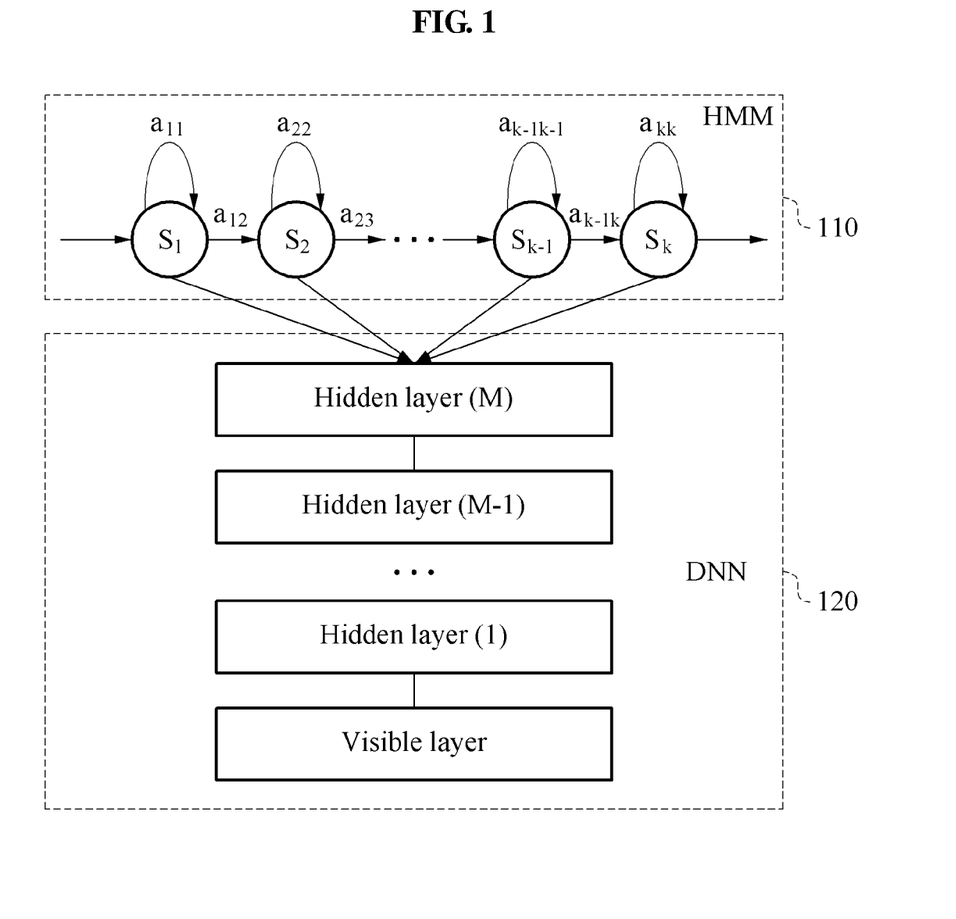
FIG. 1 is a diagram illustrating speech recognition technology in a context-dependent deep neural network-hidden Markov model (CD-DNN-HMM) structure according to an embodiment.

FIG. 1 is a diagram illustrating speech recognition technology in a context-dependent deep neural network-hidden Markov model (CD-DNN-HMM) structure according to an embodiment.

The CD-DNN-HMM structure uses a combination of a hidden Markov model (HMM) structure 110 and a deep neural network (DNN) structure 120 including a visible layer and a plurality of hidden layers, and is a speech recognition method in which a DNN structure including a DNN configured through various training methods is organically combined with an existing HMM structure.

To use such a combination of the HMM structure 110 and the DNN structure 120 for speech recognition, initial HMM-state level alignment information may be needed. To obtain the HMM-state level alignment information from each set of data in a vast training data model set, existing Gaussian mixture model-HMM (GMM-HMM) algorithm based speech recognition technology may need to be used. Thus, performance of CD-DNN-HMM algorithm based speech recognition may be greatly affected by performance of GMM-HMM algorithm based speech recognition.

However, in general GMM-HMM algorithm based speech recognition technology, an accuracy in obtaining HMM-state level information associated with an input speech signal may not be guaranteed, which may restrict the performance of the CD-DNN-HMM algorithm based speech recognition. Thus, to greatly improve the performance of the CD-DNN-HMM algorithm based speech recognition, the accuracy in obtaining the HMM-state level information may need to increase or a feature suitable for the CD-DNN-HMM structure may need to be additionally considered.

In a GMM-HMM based speech recognition system, an error in an input of a feature vector and use of an input speech signal contaminated with background noise may be a hindrance to the accuracy in obtaining the HMM-state level information.

In general, the GMM-HMM algorithm based speech recognition technology uses, as an input, an existing 39th-order mel-frequency cepstral coefficient (MFCC) algorithm based feature vector. However, such an MFCC algorithm based feature vector may have a limitation in providing sufficient information used to automatically recognize a speech in the GMM-HMM based speech recognition system. Thus, using, as an input, a gammatone filterbank signal analysis algorithm based feature vector or a bottleneck algorithm based feature vector in replacement of such an existing MFCC algorithm based feature vector, the performance of the GMM-HMM algorithm based speech recognition may be improved and high-quality HMM-state level information may be extracted.

In addition, in the CD-DNN-HMM algorithm based speech recognition technology, sets of training data expressing various variations in a speech may be used and a portion of such training data may include speech signals contaminated with background noise. The background noise included in the training data may also hinder extraction of accurate HMM-state level information. Thus, by eliminating such background noise through preprocessing, the accuracy in obtaining the HMM-state level information may be improved.

Figure 2:
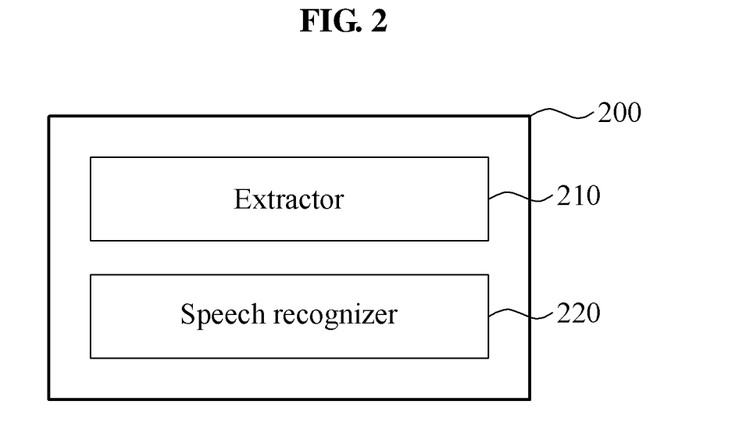
FIG. 2 is a block diagram illustrating a speech recognition apparatus according to an embodiment.

FIG. 2 is a block diagram illustrating a speech recognition apparatus 200 according to an embodiment.

The speech recognition apparatus 200 may be used to increase an accuracy of HMM-state level information required for a CD-DNN-HMM structure, and improve performance in speech recognition based further on a feature suitable for the CD-DNN-HMM structure.

Referring to FIG. 2, the speech recognition apparatus 200 includes an extractor 210 and a speech recognizer 220.

The extractor 210 may extract acoustic model-state level information corresponding to an input speech signal from a training data model set using at least one of a first feature vector based on a gammatone filterbank signal analysis algorithm and a second feature vector based on a bottleneck algorithm.

The acoustic model-state level information may be HMM-state level information.

The extractor 210 may obtain the acoustic model-state level information by applying at least one of the first feature vector and the second feature vector to a GMM-HMM technology based training data model set.

The first feature vector refers to a feature vector to be extracted based on the gammatone filterbank signal analysis algorithm, and may be determined based on an intra-frame feature value, a static feature value, and an inter-frame feature value. The intra-frame feature value reflects a feature of a rapid change in a spectrum of the input speech signal, which is not considered in a quasi-stationary assumption, an existing feature vector extracting method. The static feature value reflects a static feature of the input speech signal extracted by dividing time-series analysis frames from the input speech signal under the quasi-stationary assumption. The inter-frame feature value reflects a dynamic feature of the input speech signal based on a lapse of a period of time.

The second feature vector refers to a feature vector to be extracted based on the bottleneck algorithm using deep learning technology, and may be obtained by directly learning an equation required for extracting a feature from the training data model set based on a DNN algorithm.

The speech recognizer 220 may provide a result of recognizing the input speech signal based on the extracted acoustic model-state level information.

The speech recognition apparatus 200 may further include a preprocessor configured to eliminate background noise included in training data to increase an accuracy in extracting the acoustic model-state level information.

The preprocessor may classify at least one set of training data into clean data, stationary noisy data, and non-stationary noisy data using an energy value measured in a preset frame unit of the training data. For the classifying, the preprocessor may include a measurer and a determiner. The measurer may divide the training data into preset frame units, and measure an energy value of each of the frame units. The determiner may determine the training data to be the clean data when a mean of measured energy values is less than a first threshold value, and determine the training data to be noisy data when the mean of the measured energy values is greater than or equal to the first threshold value. In addition, the determiner may calculate a deviation between energy values of the training data determined to be the noisy data, and determine the training data to be the stationary noisy data when the calculated deviation is less than a second threshold value, and determine the training data to be the non-stationary noisy data when the calculated deviation is greater than or equal to the second threshold value.

When the training data is determined to be the stationary noisy data, the preprocessor may eliminate the stationary noisy data using single channel speech enhancement technology. When the training data is determined to be the non-stationary noisy data, the preprocessor may eliminate the non-stationary noisy data using single channel speech separation technology.

For the speech recognition apparatus 200 to further consider the feature suitable for the CD-DNN-HMM structure, the extractor 210 may extract the acoustic model-state level information additionally using a third feature vector including at least one of a spectral entropy based additional feature, a harmonic component ratio based additional feature, and a pitch information based additional feature.

In general, in CD-DNN-HMM based large vocabulary continuous speech recognition (LVCSR), a filterbank output reflecting a human auditory characteristic, for example, a log-scale mel-frequency filterbank output energy, may be used as an input. In addition, an additional feature suitable for the CD-DNN-HMM structure, for example, the spectral entropy based additional feature, the harmonic component ratio based additional feature, and the pitch information based additional feature, may be added as an input, and thus a more accurate result in speech recognition may be achieved.

To extract the spectral entropy based additional feature, a spectrum is transformed to $x_i$ to calculate an entropy based feature.

$$x_i = \frac{X_i}{\max\{X_i\}} \text{ for } i = 1 \text{ to } N \quad \text{[Equation 1]}$$

In Equation 1, "$x_i$" denotes an energy value of an i-th frequency component of the spectrum, and an entropy may be calculated as represented by Equation 2.

$$H(x) = -\sum_{i=1}^{N} x_i \times \log_{10} x_i \quad \text{[Equation 2]}$$

In Equation 2, a dynamic range of the entropy is limited to (0, 50), and is transformed by Equation 3.

$$\text{entropy feature} = \log\left(\frac{H(x)/50 + 0.0001}{1.0001 - H(x)/50}\right) \quad \text{[Equation 3]}$$

To extract the harmonic component ratio based additional feature, a spectral energy $x_i$ is smoothed and a peak value is calculated.

$$\overline{X}_i = \Sigma_{j=i-2}^{i+2} X_j / 5 \quad \text{[Equation 4]}$$

Equation 4 represents a calculation for smoothing the spectral energy $x_i$, and the peak value is determined through a peak-picking method in which a peak value of $x_i$ is selected from values less than or equal to 4 kilohertz (kHz).

A spectral energy difference is calculated using the smoothed spectral energy value and the selected peak value as represented by Equation 5.

$$\dot{X}_i = X_i - \overline{X}_i \quad \text{[Equation 5]}$$

A harmonic component ratio may be calculated using Equation 6 below after the number of times of spectral peaks is counted when a value of $\log_{10}(x_i)$ is greater than a value of $\theta_{th}$ ($\log_{10}(x_i) > \theta_{th}$) based on the calculated spectral energy difference.

$$H \text{ ratio} = \frac{\# \text{ of spectral peak}}{\# \text{ of spectral bins under 4 kHz}} \quad \text{[Equation 6]}$$

$$\text{harmonic ratio} = \log\left(\frac{H \text{ ratio} + 0.0001}{1.0001 - H \text{ ratio}}\right)$$

To extract the pitch information based additional feature, a time domain speech signal is input.

A normalized autocorrelation of the time domain speech signal is calculated, and a voiced frame and an unvoiced frame are detected using a result of calculating the normalized autocorrelation. In addition, a maximum peak value is detected in a preset pitch range, for example, in a range between 60 hertz (Hz) and 516 Hz, based on the normalized autocorrelation, and a pitch is measured. As a result of detecting such frames, a pitch normalized at 516 Hz is used for a voice or a speech, and a normalized pitch is determined to be 0.1 for a non-voice or a non-speech.

$$\text{log\_scale\_pitch} = \log\left(\frac{\text{nor\_pitch} + 0.0001}{1.0001 - \text{nor\_pitch}}\right) \quad \text{[Equation 7]}$$

Figure 3:
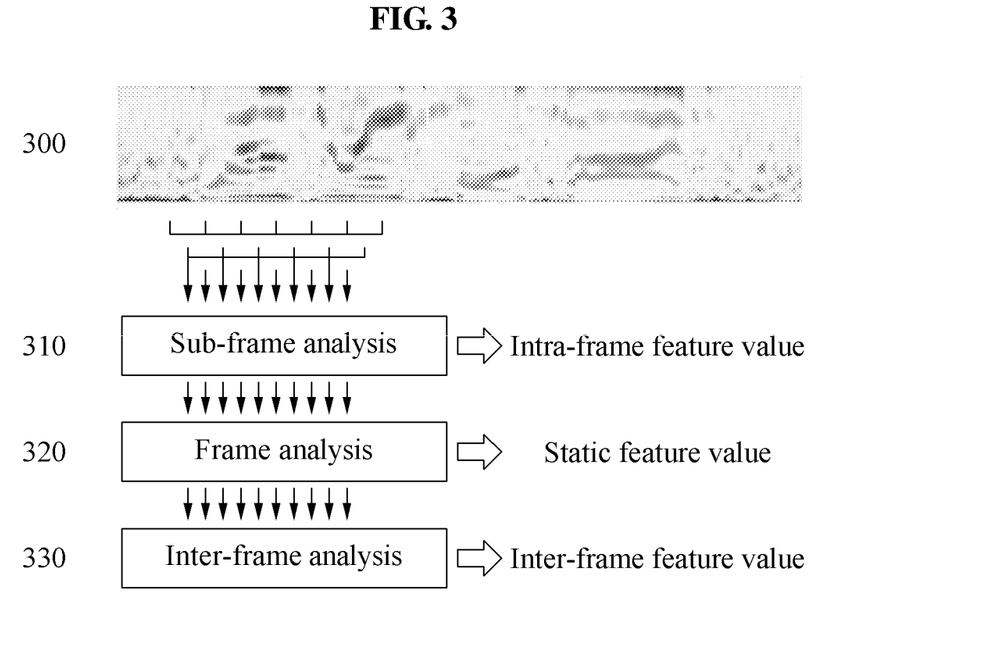
FIG. 3 is a diagram illustrating a process of extracting a feature vector based on a gammatone filterbank signal analysis algorithm according to an embodiment.

FIG. 3 is a diagram illustrating a process of extracting a feature vector based on a gammatone filterbank signal analysis algorithm according to an embodiment.

In an existing feature extracting method, a static feature vector may be extracted by dividing an input speech signal into time-series analysis frames through windowing under a quasi-stationary assumption. Subsequently, a dynamic feature vector represented by a delta or a double delta may be extracted to express a dynamic feature that changes over time with respect to the static feature vector, and may be combined with the static feature vector to configure a feature vector column. Here, the delta indicates a physical velocity, and the double delta indicates a physical acceleration. Thus, the delta and the double delta may also indicate a primary dynamic change feature and a secondary dynamic change feature, respectively.

Dissimilar to the existing feature extracting method in which the static feature vector and the dynamic feature vector are simply extracted, in the process of extracting a feature vector based on a gammatone filterbank signal analysis algorithm used in the speech recognition apparatus 200 of FIG. 2, an intra-frame feature value, a static feature value, and an inter-frame feature value may be extracted and the extracted feature values may be used for speech recognition.

As illustrated in FIG. 3, in 310, the intra-frame feature value refers to a feature vector for expressing a rapid transition of a speech spectrum 300 of an input speech signal, and may reflect a feature of a rapid change in the speech spectrum 300 of the input speech signal, which is not reflected in the quasi-stationary assumption that is the existing feature extracting method. Such a rapid transition of the speech spectrum 300 of the input speech signal may occur mainly in a consonantal portion of the input speech signal. Such a rapid transition of the speech spectrum 300 that indicates a change in one analysis frame may be extracted using a sub-frame analysis method.

In 320, the static feature value reflects a static feature of the input speech signal that is extracted by dividing the input speech signal into time-series analysis frames under the quasi-stationary assumption. The static feature value may be extracted by the existing feature extracting method, and may be determined by estimating energy of the input speech signal from an envelope of a total peak value using a peak value of a time-frequency signal. However, in 320, in a case of analyzing the time-frequency signal, a new method reflecting a feature robust against noise may be adopted.

In 330, the inter-frame feature value may reflect a dynamic feature of the input speech signal based on a lapse of a period of time, and a third-order dynamic change feature of the speech spectrum 300 may be extracted using a temporal discrete cosine transform (DCT) method.

Figure 4:
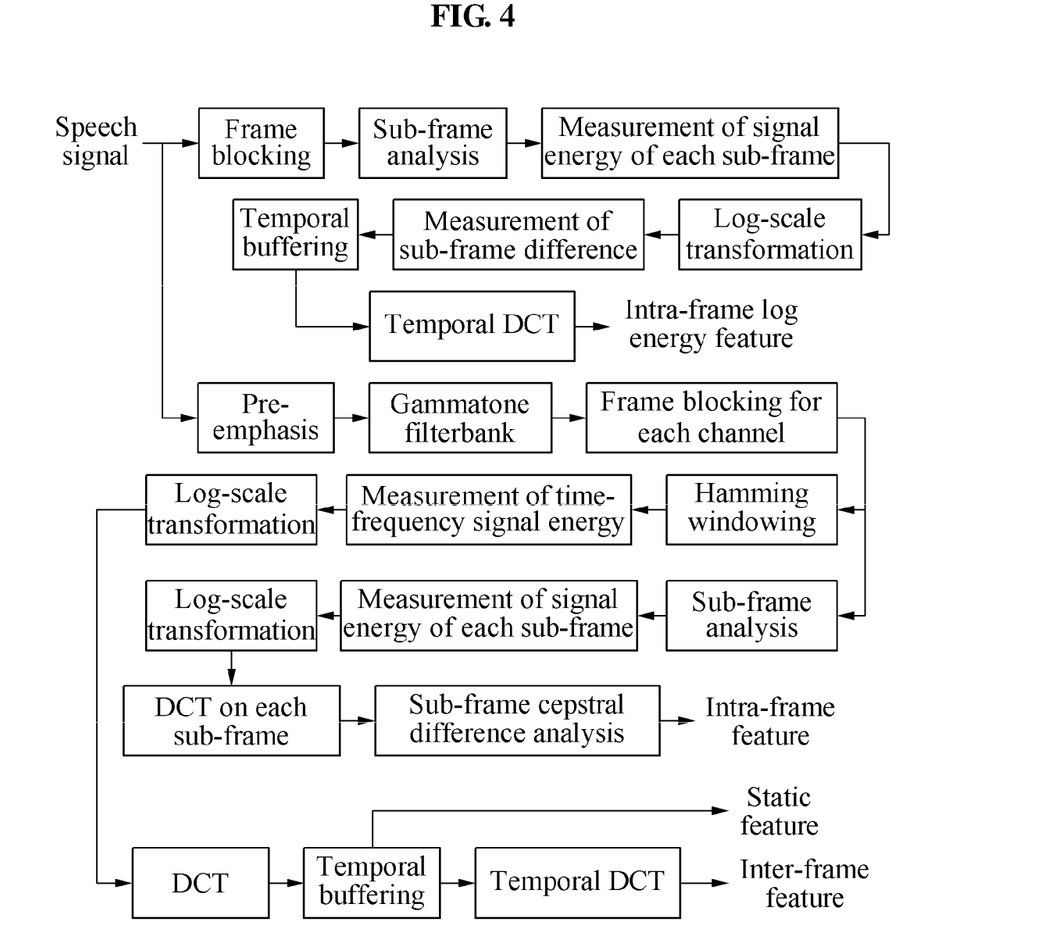
FIG. 4 is a block diagram illustrating a process of extracting a feature vector based on a gammatone filterbank signal analysis algorithm according to an embodiment.

FIG. 4 is a block diagram illustrating a process of extracting a feature vector based on a gammatone filterbank signal analysis algorithm according to an embodiment.

A feature vector based on a gammatone filterbank signal analysis algorithm may be determined based on an intra-frame feature value, a static feature value, and an inter-frame feature value.

The intra-frame feature value relates to a feature of a rapid change in a spectrum of an input speech signal, which is not reflected in a quasi-stationary assumption that is an existing feature vector extracting method, and may reflect a dynamic feature of a sub-frame log energy difference extracted using a 13th-order sub-frame cepstral difference, a sub-frame log energy difference, and a temporal DCT. A process of estimating the sub-frame log energy difference may be performed as illustrated in FIG. 5.

Figure 5:
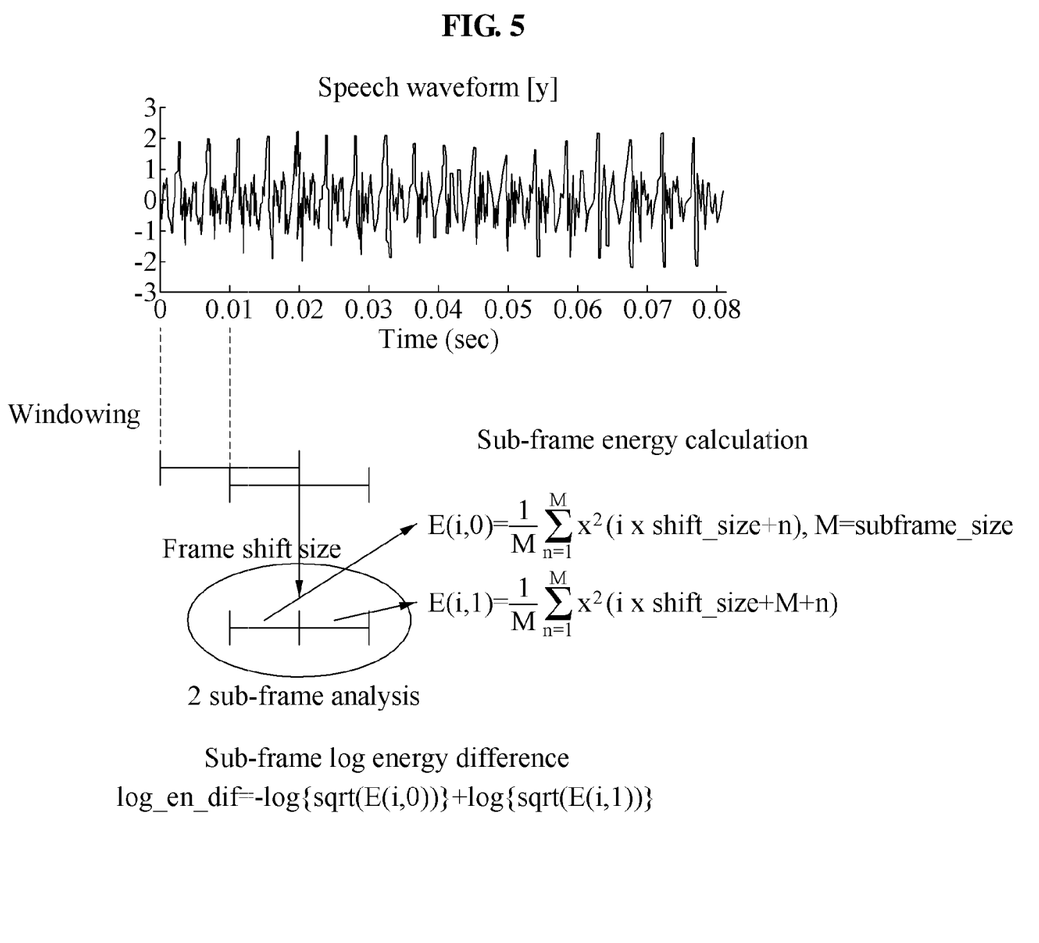
FIG. 5 is a diagram illustrating a process of extracting an intra-frame feature value in a process of extracting a feature vector based on a gammatone filterbank signal analysis algorithm according to an embodiment.

Referring to FIG. 5, a waveform of an input speech signal is divided into time-series analysis frames through windowing, and sub-frame energy may be calculated using a frame shift size obtained through a two sub-frame analysis. A sub-frame log energy difference may be determined using a result of calculating the sub-frame energy.

Referring back to FIG. 4, the static feature value relates to a static feature of the input speech signal extracted by dividing the input speech signal into the time-series analysis frames under the quasi-stationary assumption, and may reflect a 13th-order static feature extracted using a DCT method. In the extracting of the static feature value, a time-frequency signal energy estimating method may be used. Such a method may be performed by selecting a peak value from an output of a gammatone filterbank, for example, peak-picking, and by calculating a peak energy mean or average.

The inter-frame feature value relates to a dynamic feature of the input speech signal based on a lapse of a period of time, and may reflect a 39th-order dynamic change feature of a speech spectrum extracted using the temporal DTC method.

Figure 6:
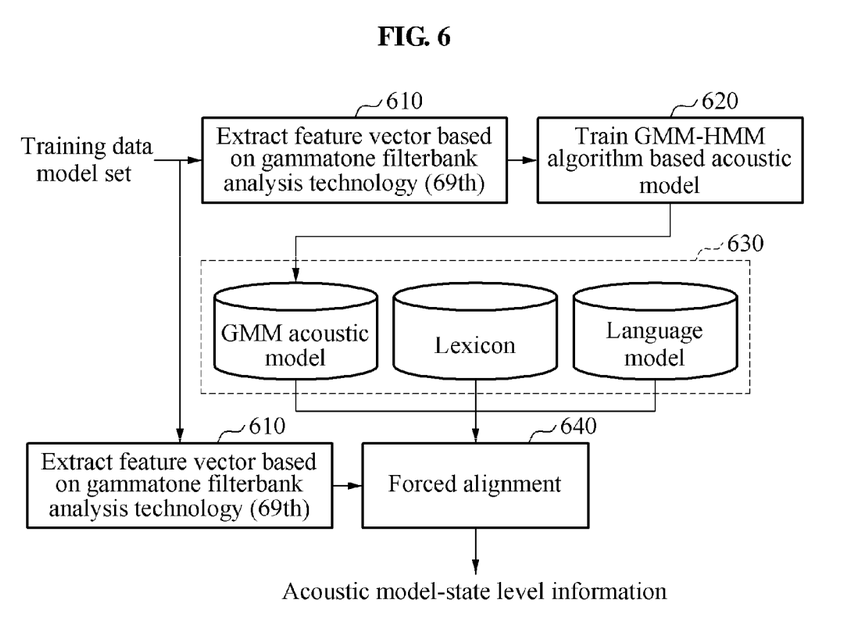
FIG. 6 is a diagram illustrating a process of extracting acoustic model-state level information using a gammatone filterbank signal analysis algorithm based feature vector according to an embodiment.

FIG. 6 is a diagram illustrating a process of extracting acoustic model-state level information using a gammatone filterbank signal analysis algorithm based feature vector according to an embodiment.

Referring to FIG. 6, in operation 610, a feature vector is extracted by applying a gammatone filterbank signal analysis algorithm to a training data model set including at least one set of training data.

Dissimilar to an existing feature extracting method in which a static feature vector and a dynamic feature vector are simply extracted, in the process of extracting the feature vector based on the gammatone filterbank signal analysis algorithm, an intra-frame feature value, a static feature value, and an inter-frame feature value may be extracted and the extracted feature values may be used for speech recognition.

The intra-frame feature value refers to a feature vector to express a rapid transition of a speech spectrum, and reflects a feature of a rapid change in a spectrum of an input speech signal, which is not reflected in a quasi-stationary assumption that is the extracting feature extracting method. The rapid transition of the speech spectrum that changes in one analysis frame may be extracted using a sub-frame analysis method.

The static feature value reflects a static feature of the input speech signal extracted by dividing the input speech signal into time-series analysis frames under the quasi-stationary assumption. The static feature value may be extracted using the existing feature extracting method, and determined by estimating energy of the input speech signal from an envelope of a total peak value using a peak value of a time-frequency signal.

The inter-frame feature value reflects a dynamic feature of the input speech signal based on a lapse of a period of time, and a third-order dynamic change feature of the speech spectrum may be extracted using a temporal DCT method.

In operation 620, a result of extracting of the feature vector based on the gammatone filterbank signal analysis algorithm is used to train a GMM-HMM algorithm based acoustic model 630. The acoustic model 630 includes a GMM acoustic model, a lexicon, and a language model.

In operation 640, acoustic model-state level information is obtained through forced alignment of the result of extracting the feature vector based on the gammatone filterbank signal analysis algorithm performed in operation 610 and a result of training the GMM-HMM algorithm based acoustic model 630 performed in operation 620.

Figure 7:
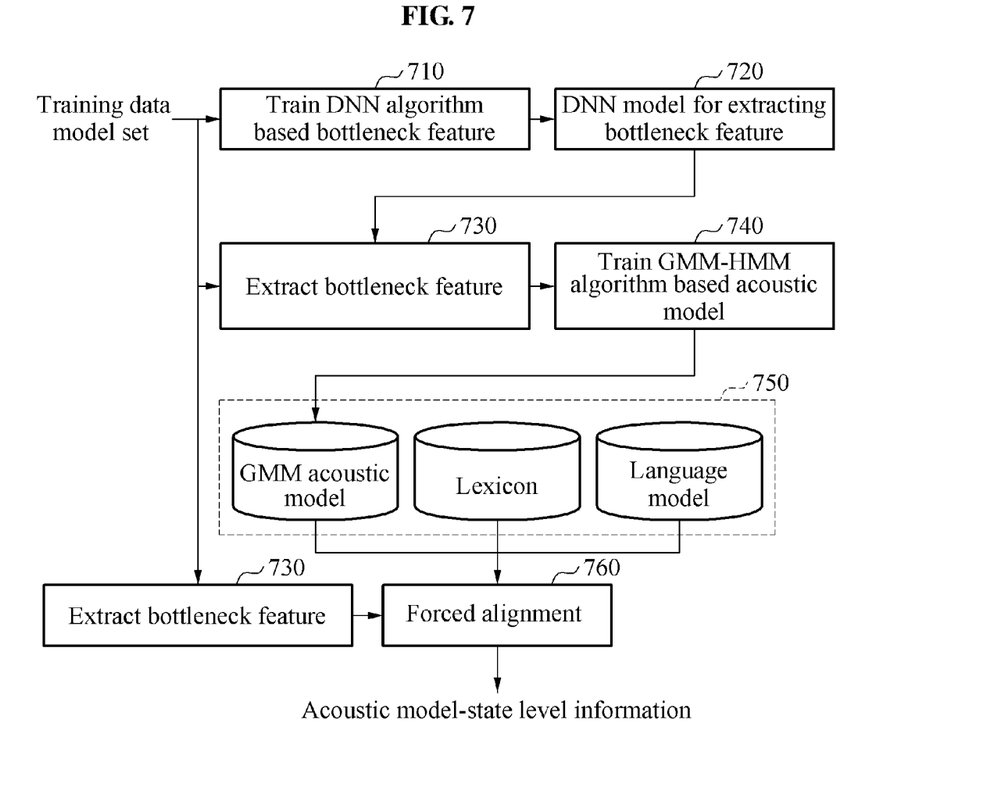
FIG. 7 is a diagram illustrating a process of extracting acoustic model-state level information using a bottleneck algorithm based feature vector according to an embodiment.

FIG. 7 is a diagram illustrating a process of extracting acoustic model-state level information using a bottleneck algorithm based feature vector according to an embodiment. A speech recognition apparatus described herein may obtain more accurate acoustic-model-state level information and also improve performance of CD-DNN-HMM algorithm based LVCSR by increasing performance of a GMM-HMM algorithm based speech recognition system using, as an input, a bottleneck algorithm based feature vector using deep learning technology.

A bottleneck algorithm based feature refers to a feature to be extracted based on a DNN algorithm. Dissimilar to an existing handcrafting feature extracting method, for example, an MFCC algorithm, a perceptual linear prediction (PLP), and a gammatone cepstral coefficient (GTCC) algorithm, a bottleneck algorithm may directly learn an equation required for extracting a feature from training data. The bottleneck algorithm is known to have higher performance compared to the existing handcrafting feature extracting method, and thus a GMM-HMM technology based speech recognition system using such a bottleneck algorithm based feature may extract more accurate HMM-state level information.

A bottleneck algorithm based feature vector may be extracted by training a process of extracting a feature of a speech from training speech data using a DNN algorithm based neural network. Referring to FIG. 7, in operation 710, DNN algorithm based bottleneck feature training is applied to a training data model set including at least one set of training data. In operation 720, a result of the DNN algorithm based bottleneck feature training is applied to a DNN model. In operation 730, a bottleneck feature is extracted.

In operation 740, a result of extracting the bottleneck feature is used to train a GMM-HMM algorithm based acoustic model 750. The acoustic model 750 includes a GMM acoustic model, a lexicon, and a language model.

In operation 760, acoustic model-state level information is obtained through forced alignment of the result of extracting the bottleneck feature in operation 730 and a result of training the GMM-HMM algorithm based acoustic model 750 in operation 740.

Figure 8:
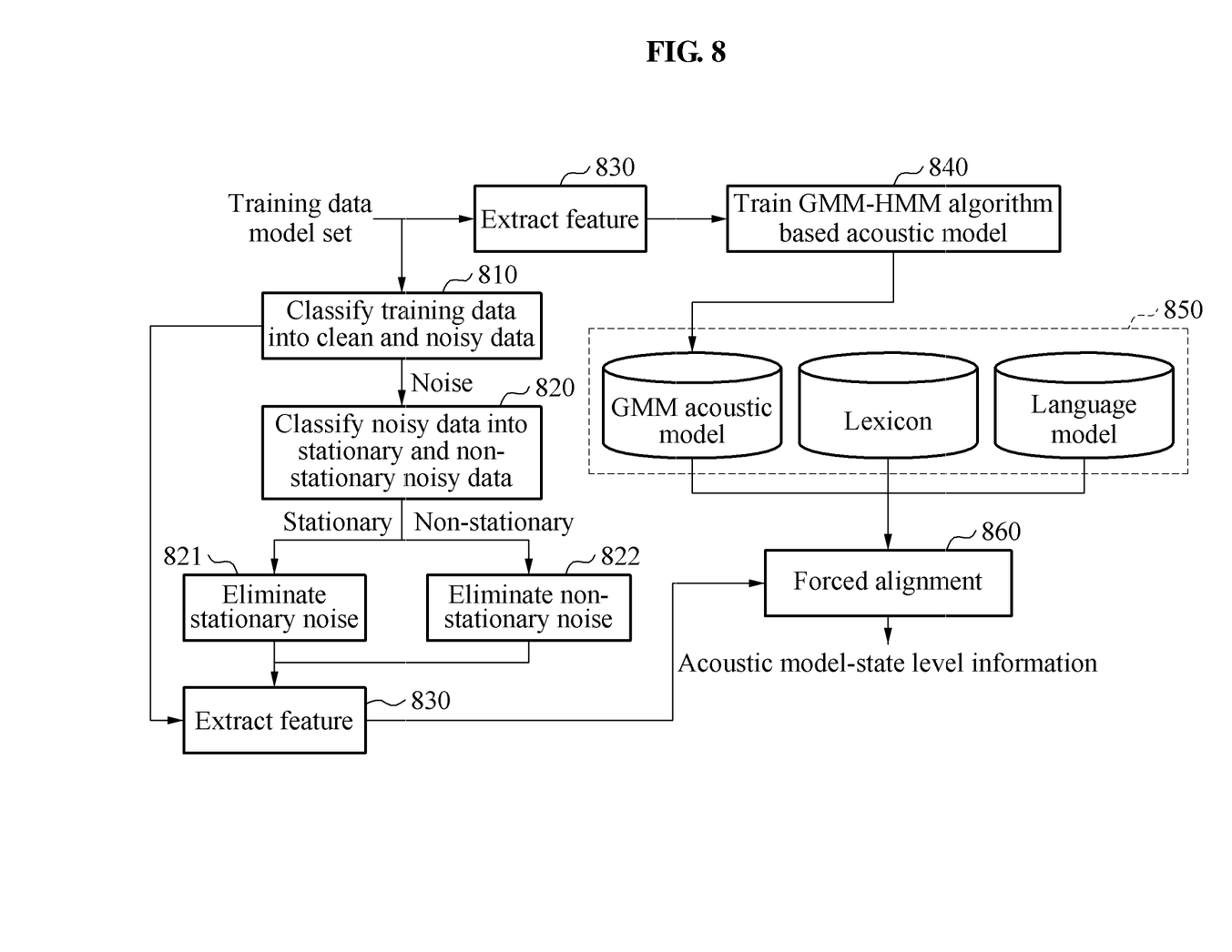
FIG. 8 is a diagram illustrating a process of extracting acoustic model-state level information after preprocessing training data according to an embodiment.

FIG. 8 is a diagram illustrating a process of extracting acoustic model-state level information after preprocessing training data according to an embodiment.

For training a CD-DNN-HMM algorithm based LVCSR system, sets of training data expressing various variations in a speech may be used. A portion of the training data may include a speech signal contaminated with background noise. The background noise may be a hindrance to extraction of accurate acoustic model-state level information. Thus, by eliminating such background noise through preprocessing, more accurate acoustic model-state level information may be extracted and performance of the CD-DNN-HMM algorithm based LVCSR system may be improved.

The preprocessing used to eliminate the background noise may be performed on a training data model set including at least one set of training data before extracting a feature vector. A speech recognition apparatus described herein may classify the training data into clean data and noisy data. The noisy data may be classified into stationary noisy data and non-stationary noisy data.

In the preprocessing, the training data included in the training data model set may be divided by a preset frame unit, and an energy value may be measured for each frame. In operation 810, the training data is classified as the clean data when a mean of measured energy values is less than a first threshold value, and the training data is classified as the noisy data when the mean of the measured energy values is greater than or equal to the first threshold value.

In operation 820, the speech recognition apparatus calculates a deviation between energy values of the training data determined to be the noisy data, and classifies the training data as the stationary noisy data when the calculated deviation is less than a second threshold value, and classifies the training data as the non-stationary noisy data when the calculated deviation is greater than or equal to the second threshold value.

In operation 821, when the training data is determined to be the stationary noisy data, the stationary noisy data is eliminated in advance using single channel speech enhancement technology based on, for example, a Kalman algorithm, a minimum mean square error (MMSE) algorithm, and a Wiener algorithm. In operation 822, when the training data is determined to be the non-stationary noisy data, the non-stationary noisy data is eliminated in advance using single channel speech separation technology based on, for example, a non-negative matrix factorization (NMF) algorithm.

In operation 830, a feature is extracted through the preprocessing. In operation 840, the extracted feature is used to train a GMM-HMM algorithm based acoustic model 850. The acoustic model 850 includes a GMM acoustic model, a lexicon, and a language model.

In operation 860, more accurate acoustic model-state level information is obtained through forced alignment of a result of extracting the feature in operation 830 and a result of training the GMM-HMM algorithm based acoustic model 850 in operation 840.

However, when the training data is determined to be the clean data, the acoustic model-state level information may be obtained without the preprocessing.

Figure 9:
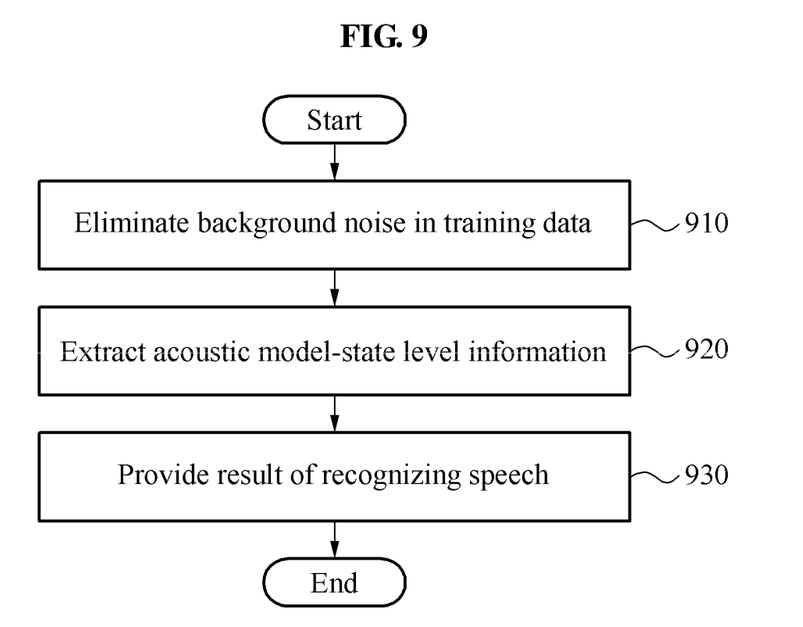
FIG. 9 is a flowchart illustrating a speech recognition method according to an embodiment.

FIG. 9 is a flowchart illustrating a speech recognition method according to an embodiment. The speech recognition method may be performed by a speech recognition apparatus, for example, the speech recognition apparatus 200 described with reference to FIG. 2.

Referring to FIG. 9, in operation 910, the preprocessor of the speech recognition apparatus 200 eliminates background noise included in training data to increase an accuracy in extracting acoustic model-state level information.

In operation 910, the preprocessor may classify at least one set of training data into clean data, stationary noisy data, and non-stationary noisy data using an energy value measured for each preset frame of the training data. The preprocessor may divide the training data into preset frame units, and measure an energy value of each frame unit. Here, when a mean of measured energy values is less than a first threshold value, the training data may be classified as the clean data. When the mean of the measured energy values is greater than or equal to the first threshold value, the training data may be classified as the noisy data. In addition, the preprocessor may calculate a deviation between energy values of the training data classified as the noisy data. Here, when the calculated deviation is less than a second threshold value, the training data may be classified as the stationary noisy data. When the calculated deviation is greater than or equal to the second threshold value, the training data may be classified as the non-stationary noisy data.

In operation 910, when the training data is determined to be the stationary noisy data, the stationary noisy data may be eliminated using single channel speech enhancement technology. When the training data is determined to be the non-stationary noisy data, the non-stationary noisy data may be eliminated using single channel speech separation technology. However, when the training data is determined to be the clean data, the acoustic model-state level information may be obtained without the preprocessing.

In operation 920, the extractor 210 of the speech recognition apparatus 200 extracts acoustic model-state level information corresponding to an input speech signal from a training data model set using at least one of a first feature vector based on a gammatone filterbank signal analysis algorithm and a second feature vector based on a bottleneck algorithm. The extractor 210 may obtain the acoustic model-state level information by applying at least one of the first feature vector and the second feature vector to a GMM-HMM technology based training data model set.

The acoustic model-state level information may be HMM-state level information.

The first feature vector refers to a feature vector to be extracted based on the gammatone filterbank signal analysis algorithm, and may be determined based on an intra-frame feature value, a static feature value, and an inter-frame feature value. The intra-frame feature value may reflect a feature of a rapid change in a spectrum of the input speech signal, which is not reflected in a quasi-stationary assumption that is an existing feature extracting method. The static feature value may reflect a static feature of the input speech signal extracted by dividing the input speech signal into time-series analysis frames under the quasi-stationary assumption. The inter-frame feature value may reflect a dynamic feature of the input speech signal based on a lapse of a period of time.

The second feature vector refers to a feature vector to be extracted based on the bottleneck algorithm using deep learning technology, and may be obtained by directly learning an equation required for extracting a feature from the training data model set based on a DNN algorithm.

In operation 920, the speech recognition apparatus 200 may extract the acoustic model-state level information by additionally using a third feature vector including at least one of a spectral entropy based additional feature, a harmonic component ratio based additional feature, and a pitch information based additional feature, to further reflect a feature suitable for a CD-DNN-HMM structure. In general, in CD-DNN-HMM based LVCSR, a filterbank output reflecting a human auditory characteristic, for example, log-scale mel-frequency filterbank output energy, may be used as an input. In addition to such a general input, the spectral entropy based additional feature, the harmonic component ratio based additional feature, and the pitch information based additional feature, which are an additional feature suitable for the CD-DNN-HMM structure, may be used as an input to obtain more accurate result in speech recognition.

In operation 930, the speech recognizer 220 of the speech recognition apparatus 200 provides a result of recognizing the input speech signal based on the extracted acoustic model-state level information.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The above-described embodiments of the present disclosure may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tapes; optical media such as CD ROMs and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present disclosure, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A speech recognition apparatus, comprising:
    an extractor configured to extract acoustic model-state level information corresponding to an input speech signal from a training data model set using at least one of a first feature vector based on a gammatone filterbank signal analysis algorithm and a second feature vector based on a bottleneck algorithm; and
    a speech recognizer configured to provide a result of recognizing the input speech signal based on the extracted acoustic model-state level information,
    wherein the extractor is configured to obtain the acoustic model-state level information by applying at least one of the first feature vector and the second feature vector to a Gaussian mixture model-hidden Markov model (GMM-HMM) technology based training data model set, and
    wherein the first feature vector is determined based on an intra-frame feature value associated with a feature of a rapid change in a spectrum of the input speech signal, a static feature value associated with a static feature of the input speech signal, and an inter-frame feature value associated with a dynamic feature of the input speech signal based on a lapse of a period of time.

2. The apparatus of claim 1, wherein the second feature vector is obtained by directly learning an equation needed for extracting a feature from the training data model set based on a deep neural network (DNN) algorithm.

3. The apparatus of claim 1, further comprising:
    a preprocessor configured to eliminate background noise from at least one set of training data comprised in the training data model set.

4. The apparatus of claim 3, wherein the preprocessor comprises:
    a measurer configured to divide the training data into preset frame units and measure an energy value of each of the frame units; and
    a determiner configured to determine the training data to be clean data in response to a mean of measured energy values being less than a first threshold value, and determine the training data to be noisy data in response to the mean of the measured energy values being greater than or equal to the first threshold value.

5. The apparatus of claim 4, wherein the determiner is configured to calculate a deviation between energy values of the training data determined to be the noisy data, determine the training data to be stationary noisy data in response to the calculated deviation being less than a second threshold value, and determine the training data to be non-stationary noisy data in response to the calculated deviation being greater than or equal to the second threshold value.

6. The apparatus of claim 5, wherein the preprocessor is configured to eliminate the stationary noisy data using single channel speech enhancement technology in response to the training data determined to be the stationary noisy data, and eliminate the non-stationary noisy data using signal channel speech separation technology in response to the training data determined to be the non-stationary noisy data.

7. The apparatus of claim 1, wherein the extractor is configured to extract the acoustic model-state level information additionally using a third feature vector comprising at least one of a spectral entropy based additional feature, a harmonic component ratio based additional feature, and a pitch information based additional feature.

8. A speech recognition apparatus, comprising:
a preprocessor configured to eliminate background noise from at least one set of training data comprised in a training data model set;
an extractor configured to extract acoustic model-state level information corresponding to an input speech signal from the training data model set using at least one of a first feature vector based on a gammatone filterbank signal analysis algorithm and a second feature vector based on a bottleneck algorithm; and
a speech recognizer configured to provide a result of recognizing the input speech signal based on the extracted acoustic model-state level information,
wherein the extractor is configured to obtain the acoustic model-state level information by applying at least one of the first feature vector and the second feature vector to a Gaussian mixture model-hidden Markov model (GMM-HMM) technology based training data model set, and
wherein the first feature vector is determined based on an intra-frame feature value associated with a feature of a rapid change in a spectrum of the input speech signal, a static feature value associated with a static feature of the input speech signal, and an inter-frame feature value associated with a dynamic feature of the input speech signal based on a lapse of a period of time.

9. The apparatus of claim 8, wherein the preprocessor is configured to determine the training data to be one of clean data, stationary noisy data, and non-stationary noisy data using an energy value measured for each of preset frame units of the training data.

10. The apparatus of claim 9, wherein the preprocessor is configured to eliminate the stationary noisy data using single channel speech enhancement technology in response to the training data determined to be the stationary noisy data, and eliminate the non-stationary noisy data using single channel speech separation technology in response to the training data determined to be the non-stationary noisy data.

11. The apparatus of claim 8, wherein the extractor is configured to extract the acoustic model-state level information additionally using a third feature vector comprising at least one of a spectral entropy based additional feature, a harmonic component ratio based additional feature, and a pitch information based additional feature.

12. A speech recognition method, comprising:
extracting acoustic model-state level information corresponding to an input speech signal from a training data model set using at least one of a first feature vector based on a gammatone filterbank signal analysis algorithm and a second feature vector based on a bottleneck algorithm; and
providing a result of recognizing the input speech signal based on the extracted acoustic model-state level information,
wherein the extracting of the acoustic model-state level information includes obtaining the acoustic model-state level information by applying at least one of the first feature vector and the second feature vector to a Gaussian mixture model-hidden Markov model (GMM-HMM) technology based training data model set,
wherein the first feature vector is determined based on an intra-frame feature value associated with a feature of a rapid change in a spectrum of the input speech signal, a static feature value associated with a static feature of the input speech signal, and an inter-frame feature value associated with a dynamic feature of the input speech signal based on a lapse of a period of time, and the second feature vector is obtained by directly learning an equation needed for extracting a feature from the training data model set based on a deep neural network (DNN) algorithm.

13. The method of claim 12, further comprising:
eliminating background noise from at least one set of training data comprised in the training data model set.

14. The method of claim 13, wherein the eliminating of the background noise comprises:
determining the training data to be one of clean data, stationary noisy data, and non-stationary noisy data using an energy value measured for each of preset frame units of the training data; and
eliminating the stationary noisy data using single channel speech enhancement technology in response to the training data determined to be the stationary noisy data, and eliminating the non-stationary noisy data using single change speech separation technology in response to the training data determined to be the non-stationary noisy data.

15. The method of claim 12, wherein the extracting of the acoustic model-state level information comprises: extracting the acoustic model-state level information additionally using a third feature vector comprising at least one of a spectral entropy based additional feature, a harmonic component ratio based additional feature, and a pitch information based additional feature.

* * * * *